July 17, 1934.   E. G. KLAMMER ET AL   1,966,670
BRAKE MECHANISM
Filed Feb. 14, 1933   3 Sheets-Sheet 1
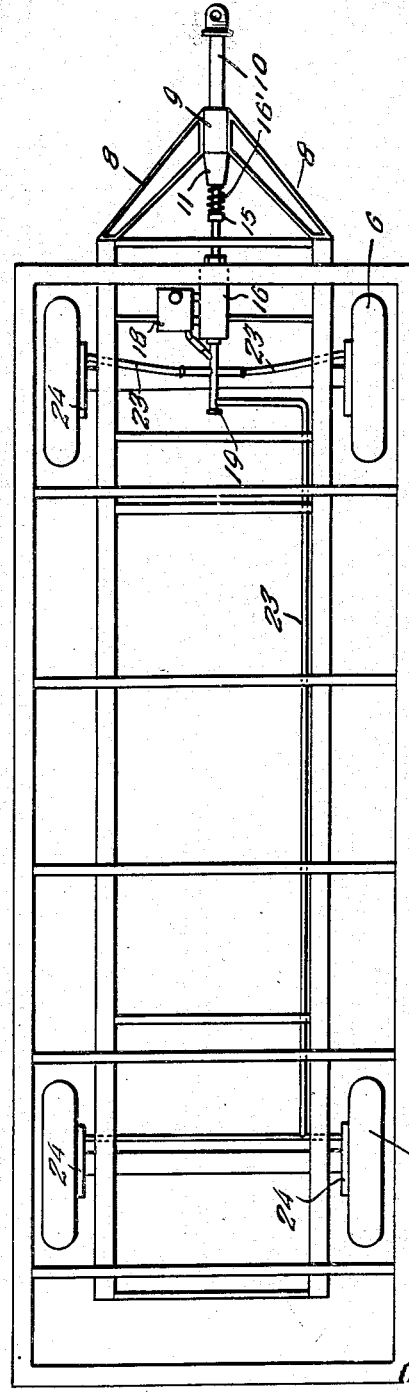
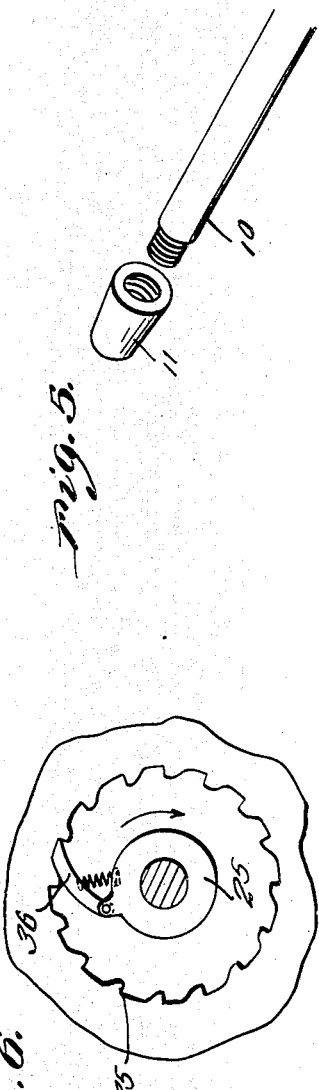
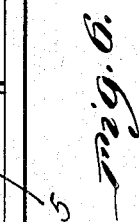
Inventors
E. G. Klammer
A. W. Klammer
R. G. Klammer
By Clarence A. O'Brien
Attorney July 17, 1934.                E. G. KLAMMER ET AL                1,966,670
                                BRAKE MECHANISM
                             Filed Feb. 14, 1933           3 Sheets-Sheet 2
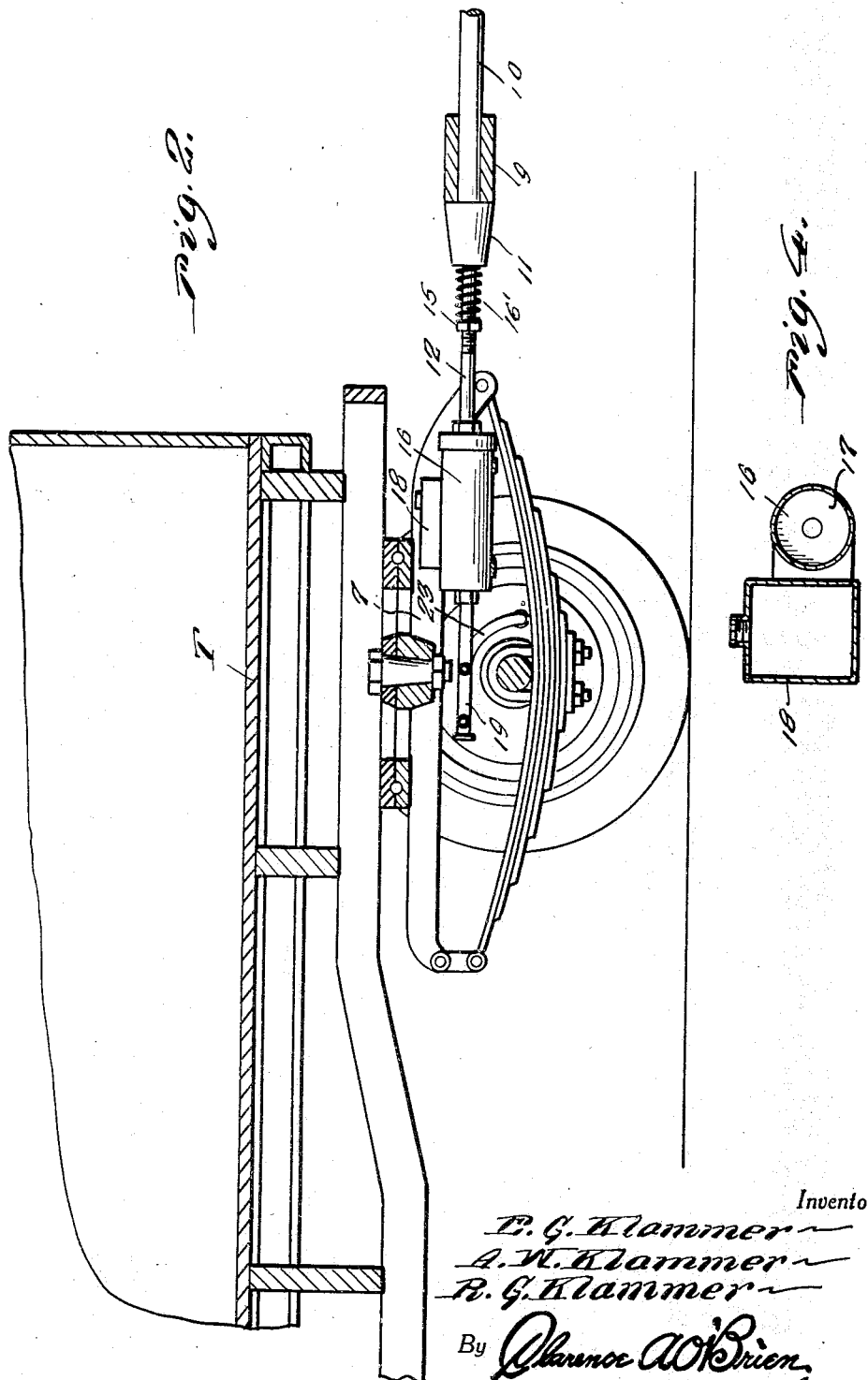
Inventors
E. G. Klammer
A. K. Klammer
R. G. Klammer
By Clarence A. O'Brien
Attorney July 17, 1934.  E. G. KLAMMER ET AL  1,966,670
BRAKE MECHANISM
Filed Feb. 14, 1933  3 Sheets-Sheet 3

Inventors
E. G. Klammer
A. W. Klammer
R. G. Klammer
By Clarence A. O'Brien
Attorney Patented July 17, 1934

1,966,670

UNITED STATES PATENT OFFICE 1,966,670

BRAKE MECHANISM

Edwin G. Klammer, Alfred W. Klammer, and Reuben G. Klammer, Howard Lake, Minn.

Application February 14, 1933, Serial No. 656,724

1 Claim. (Cl. 188—112)

The present invention relates to automatic brake mechanisms, and has more particular reference to a hydraulic brake mechanism of this kind particularly adapted for use upon a trailer vehicle for causing automatic application of the brakes of the trailer vehicle when the latter tends to travel forwardly at a greater speed than the vehicle pulling the trailer, and to automatically release the brake of the trailer vehicles when the latter tends to lock behind the pulling vehicle.

An important feature resides in the provision of means in the mechanism for releasing the brake when it is desired to have the vehicle back up the trailer.

A still further very important object of the invention resides in the provision of a mechanism of this nature which is comparatively simple in construction, strong and durable, inexpensive to manufacture, thoroughly efficient and reliable in use and operation and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a trailer chassis showing my brake mechanism incorporated thereon.

Figure 2 is a vertical section through the forward end of the trailer.

Figure 3 is a diagrammatic sectional view showing the hook up between the master cylinder and one of the brake applying cylinders and cooperating parts.

Figure 4 is a section taken substantially on the line 4—4 of Figure 3.

Figure 6 is a detail sectional view showing another embodiment of the brake releasing means used when backing up the trailer.

Figure 5:
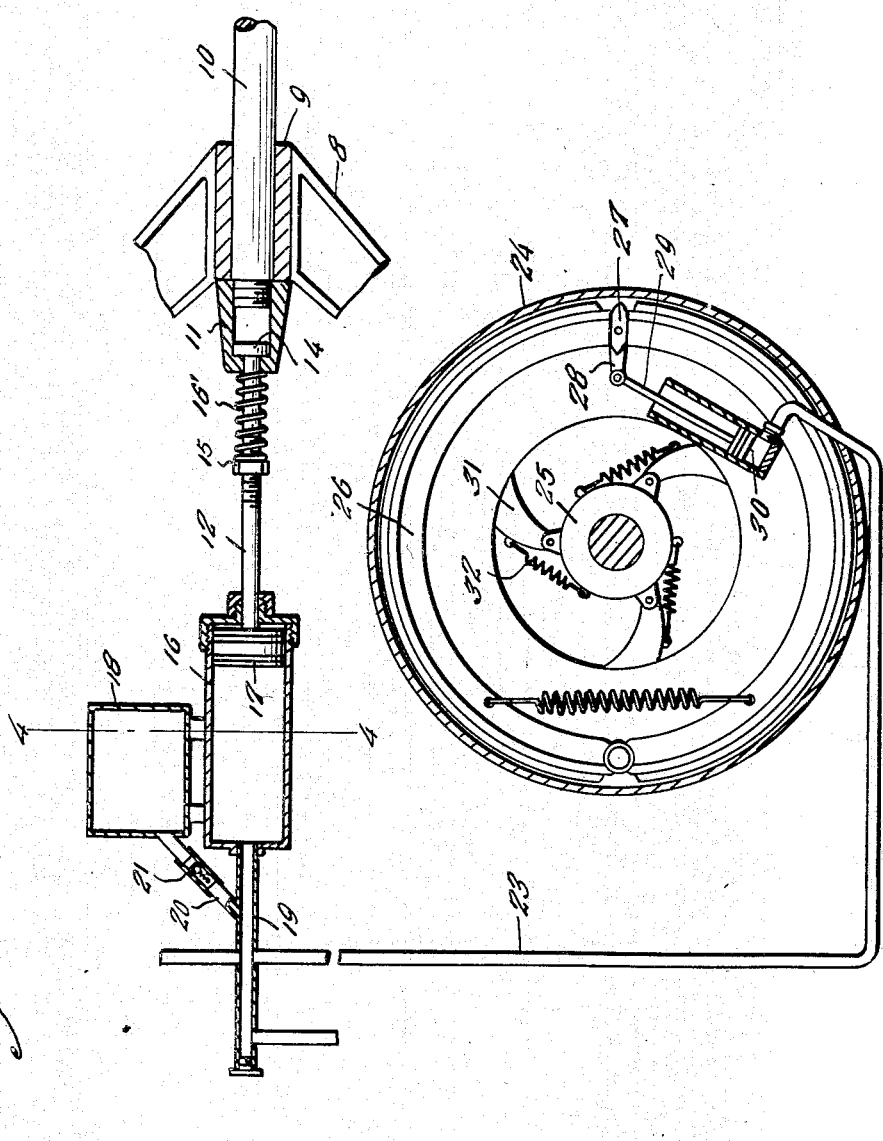
Figure 5 is a perspective view of one end of the coupler bar showing the cap removed therefrom.

Referring to the drawings in detail it will be seen that the letter T denotes generally a trailer mounted on rear wheels 5 and front wheels 6. The front wheels 6 form a part of a truck structure 7 which is rotatably connected with the front end of the trailer. From the forward end of the truck 7 there projects a V-shaped bracket 8 the apex of which is in the form of a bearing 9 to slidably receive trailer bar 10, the rear end of which is threaded to receive a cap 11. A rod 12 is slidably through the end of the cap 11 and has a head 14 slidable in the cap. A nut 15 is threadedly engaged on an intermediate portion of the rod 12 and a spring 16' impinges against this nut and the rear end of the cap 11.

A master cylinder 16 is mounted on the truck T and has a piston 17 therein connected to the rod 12. A supply tank 18 is mounted on the cylinder 16 to be located alongside of it. The main distributor pipe 19 extends from the cylinder 16. A conduit 20 connects the tank 18 with the distributor conduit 19 and has a ball check valve 21 incorporated therein which permits oil from the tank to enter the system so as to keep the system filled, the valve preventing return of the oil from the system to the tank. All four wheels 5, 5, 6 and 6 have practically identical mechanisms associated therewith and have suitable branch conduits 23 leading thereto from the distributing conduit 19. We shall therefore just describe in detail one brake mechanism and this will suffice for a clear understanding of the invention. Numeral 24 denotes a brake drum enclosing the inner portion of the hub of a wheel and rotatably supported, in any suitable manner, by an end part of an axle, the drum being disconnected from the wheel, except for the means hereinafter to be described. The numeral 25 denotes a ring fixed to rotate with the wheel in any suitable manner, said ring being located within the drum. Numerals 26 denote the usual brake shoes which are pivotally supported by a stationary part carried by an axle and which are expandible to contact with the drum by means of cam 27 actuatable by lever 28 in turn actuatable by piston rod 29 attached to piston 30 which is mounted in any usual well known manner and to which the conduit 23 leads. A plurality of dogs 31 are pivoted on the rings 25 and have springs 32 associated therewith so as to be held in frictional engagement with the drum to cause the drum to rotate with the wheel when the wheel is rotating in a forward direction. However, when the wheel is turned in an opposite direction or a reverse direction and the brakes 26 have been expanded against the drum, the drum will remain stationary while the wheel rotates in said reverse direction, as the dogs 31 will simply slip over that part of the drum which they engage. In Figure 6 we have shown another embodiment whereby the drum is provided with teeth 35 with which cooperates a spring pressed pawl 36 pivoted on the ring 25.

From the above detailed description it will be readily appreciated that as long as the trailer vehicle is traveling at the same rate of speed as the pulling vehicle the brakes are released but should the pulling vehicle slow down and the trailer vehicle start traveling faster than the pulling vehicle then the cylinder moves forwardly relatively to the piston 17 thus forcing the hydraulic means used through the conduit to apply the brakes in the usual well known manner. If it is desired to back up the trailer, the backward movement of the normally pulling vehicle will cause the piston 17 to compress the oil or other fluid in the braking system so that the pistons 30 will expand the bands or shoes 26 against the drums and then, upon continued backward movement of the pulling vehicle, the trailer will move rearwardly and the resultant rearward or reverse rotation of the wheels of the trailer will cause the dogs 31 or 36 to slip over those parts of the drums which they engage so that the wheels of the trailer can readily rotate even though the brakes are applied.

It will be noted that the spring 16' takes the strain of the forward movement of the trailer and the parts attached thereto toward the pulling vehicle and that resulting from the backing of the vehicle toward the trailer so that this spring acts as a shock absorber and prevents violent shock between the draw bar 10 and the rod 12. This arrangement also permits limited movement of the trailer toward the towing vehicle or the towing vehicle toward the trailer without application of the brakes of the trailer.

It is thought that the construction, utility and advantages of our invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In a trailer including its wheels, a brake drum for each wheel, said drum having movement relative to the wheel, means for rotatably supporting each drum from a part of the trailer, dogs pivotally connected with a part of each wheel and engaging a part of the drum, spring means for causing the dogs to engage the drum to connect the drum with the wheel when the wheel is revolving in a forward direction, but permitting movement of the wheel relative to the drum when the wheel is revolving in a reverse direction, brake shoes for each drum supported from a stationary part of the trailer, hydraulic means for expanding said shoes, such means including a master cylinder, located at the front of the trailer, a piston in said cylinder, a rod connected with the piston, a draw bar supported for sliding movement at the front of the trailer and having a cap connected to its rear end, said rod having a head at its front end slidably arranged in the cap, a spring on the rod having one end engaging the cap, and a nut threaded on the rod engaging the other end of the spring.

EDWIN G. KLAMMER.
ALFRED W. KLAMMER.
REUBEN G. KLAMMER.